(12) United States Patent
Samuel et al.

(10) Patent No.: US 11,086,612 B2
(45) Date of Patent: Aug. 10, 2021

(54) SEQUENCE AND UPDATE RULES IN FIRMWARE UPDATE SERVICES

(71) Applicant: Dell Products L.P., Round Rock, TX (US)

(72) Inventors: Balasingh Ponraj Samuel, Round Rock, TX (US); Anand Prakash Joshi, Round Rock, TX (US); Zhao Hui Yu, Cedar Park, TX (US); Chris Edward Pepper, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/540,316

(22) Filed: Aug. 14, 2019

(65) Prior Publication Data

US 2021/0048997 A1 Feb. 18, 2021

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................................. G06F 8/60–71
USPC .................................................. 717/168–178
See application file for complete search history.

(56) References Cited

U.S. PATENT DOCUMENTS

| | | | | |
|---|---|---|---|---|
| 10,120,678 B2* | 11/2018 | Downum | | G06F 8/654 |
| 10,552,138 B2* | 2/2020 | Smith | | H04L 9/3228 |
| 2013/0055155 A1* | 2/2013 | Wong | | G06F 8/65 |
| | | | | 715/810 |
| 2017/0195459 A1* | 7/2017 | e Costa | | G06F 8/65 |
| 2017/0242686 A1* | 8/2017 | Vidyadhara | | G06F 8/656 |
| 2017/0357496 A1* | 12/2017 | Smith | | H04L 9/3228 |
| 2018/0004502 A1* | 1/2018 | Samuel | | G06F 8/71 |
| 2018/0136928 A1* | 5/2018 | Downum | | G06F 8/654 |
| 2019/0347091 A1* | 11/2019 | Takaoka | | G06F 8/71 |

OTHER PUBLICATIONS

Jain, Neha, et al., Infield Firmware Update: Challenges and Solutions, 2016 International Conference on Communication and Signal Processing (ICCSP), Apr. 6-8, 2016, pp. 1232-1236, [retrieved on Apr. 29, 2021], Retrieved from the Internet: <URL:http://ieeexplore.ieee.org/>.*

(Continued)

*Primary Examiner* — Geoffrey R St Leger
(74) *Attorney, Agent, or Firm* — Jackson Walker L.L.P.

(57) ABSTRACT

An information handling system may include at least one processor, an information handling resource including a firmware, and a memory having an initial identifier stored therein. The information handling system may receive a first firmware update package specifying the initial identifier, wherein the first firmware update package includes therein an intermediate identifier different from the initial identifier; based on the first firmware update package specifying the initial identifier, update the firmware with contents of the first firmware update package, and update the initial identifier in the memory with the intermediate identifier; receive a second firmware update package specifying the intermediate identifier; and based on the second firmware update package specifying the intermediate identifier, update the firmware with contents of the second firmware update package.

15 Claims, 2 Drawing Sheets

(56) References Cited

OTHER PUBLICATIONS

Jenkins, Dylan, et al., Version Control and Patch Management of Protection and Automation Systems, 12th IET International Conference on Developments in Power System Protection, Mar. 31-Apr. 3, 2014, pp. 1-4, [retrieved on Apr. 29, 2021], Retrieved from the Internet: <URL:http://ieeexplore.ieee.org/>.*

* cited by examiner

SEQUENCE AND UPDATE RULES IN FIRMWARE UPDATE SERVICES

TECHNICAL FIELD

The present disclosure relates in general to information handling systems, and more particularly to systems and methods for updating firmware in information handling systems and information handling resources.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are frequently subject to security vulnerabilities. For example, some types of security vulnerabilities may target flaws in the firmware of an information handling system or of some information handling resource that is a component thereof. Thus there is frequently a need to update such firmware. As one example of such a firmware, a Basic Input/Output System (BIOS) may include firmware that needs to be updated.

Various firmware update services exist, allowing hardware manufacturers a simple way of distributing such updates. For example, Windows Update (WU) and Linux Vendor Firmware Service (LVFS) are both examples of firmware update services that provide such functionality. However, existing solutions have a deficiency in their ability to deal with requirements that sometimes arise relating to "intermediate" firmware update versions.

For example, it is sometimes the case that an installed firmware version is too old to allow for updating directly to the most recent firmware version. (For example, the update to the most recent firmware version might require functionality that is not present in much older versions.) In such a situation, a user will need to update to an intermediate firmware version first, before finally updating to the most recent version. It would be useful for manufacturers and others to be able to specify sequencing rules to lay out the nature of such requirements, but existing firmware update services have not provided such functionality.

Accordingly, embodiments of this disclosure may allow for specification of intermediate firmware requirements and other sequencing rules, even in the context of a firmware update service that does not natively support such features.

Further, although for the sake of concreteness, most of this disclosure discusses embodiments in the context of firmware updates, one of ordinary skill in the art with the benefit of this disclosure will understand that it may be applied in other areas as well. For example, with suitable alterations, embodiments of this disclosure may be applied in the context of other software updates.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with firmware updates in information handling systems may be reduced or eliminated.

In accordance with embodiments of the present disclosure, an information handling system may include at least one processor, an information handling resource including a firmware, and a memory having an initial identifier stored therein. The information handling system may receive a first firmware update package specifying the initial identifier, wherein the first firmware update package includes therein an intermediate identifier different from the initial identifier; based on the first firmware update package specifying the initial identifier, update the firmware with contents of the first firmware update package, and update the initial identifier in the memory with the intermediate identifier; receive a second firmware update package specifying the intermediate identifier; and based on the second firmware update package specifying the intermediate identifier, update the firmware with contents of the second firmware update package.

In accordance with these and other embodiments of the present disclosure, a method may include receiving, at an information handling system having an initial identifier stored therein, a first firmware update package specifying the initial identifier, wherein the first firmware update package includes therein an intermediate identifier different from the initial identifier; based on the first firmware update package specifying the initial identifier, the information handling system updating a firmware with contents of the first firmware update package, and updating the initial identifier with the intermediate identifier; the information handling system receiving a second firmware update package specifying the intermediate identifier; and based on the second firmware update package specifying the intermediate identifier, the information handling system updating the firmware with contents of the second firmware update package.

In accordance with these and other embodiments of the present disclosure, an article of manufacture may include a non-transitory, computer-readable medium having computer-executable code thereon that is executable by a processor of an information handling system for: transmitting, to a client system, a first firmware update package specifying an initial identifier and including therein an intermediate identifier different from the initial identifier, wherein the client system has the initial identifier stored in a memory thereof; based on the first firmware update package specifying the initial identifier, causing the client system to update a firmware thereof with contents of the first firmware update package, and causing the client system to update the initial identifier in the memory thereof with the intermediate identifier; transmitting, to the client system, a second firmware update package specifying the intermediate identifier; and based on the second firmware update package specifying the intermediate identifier, causing the client system to update the firmware thereof with contents of the second firmware update package.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
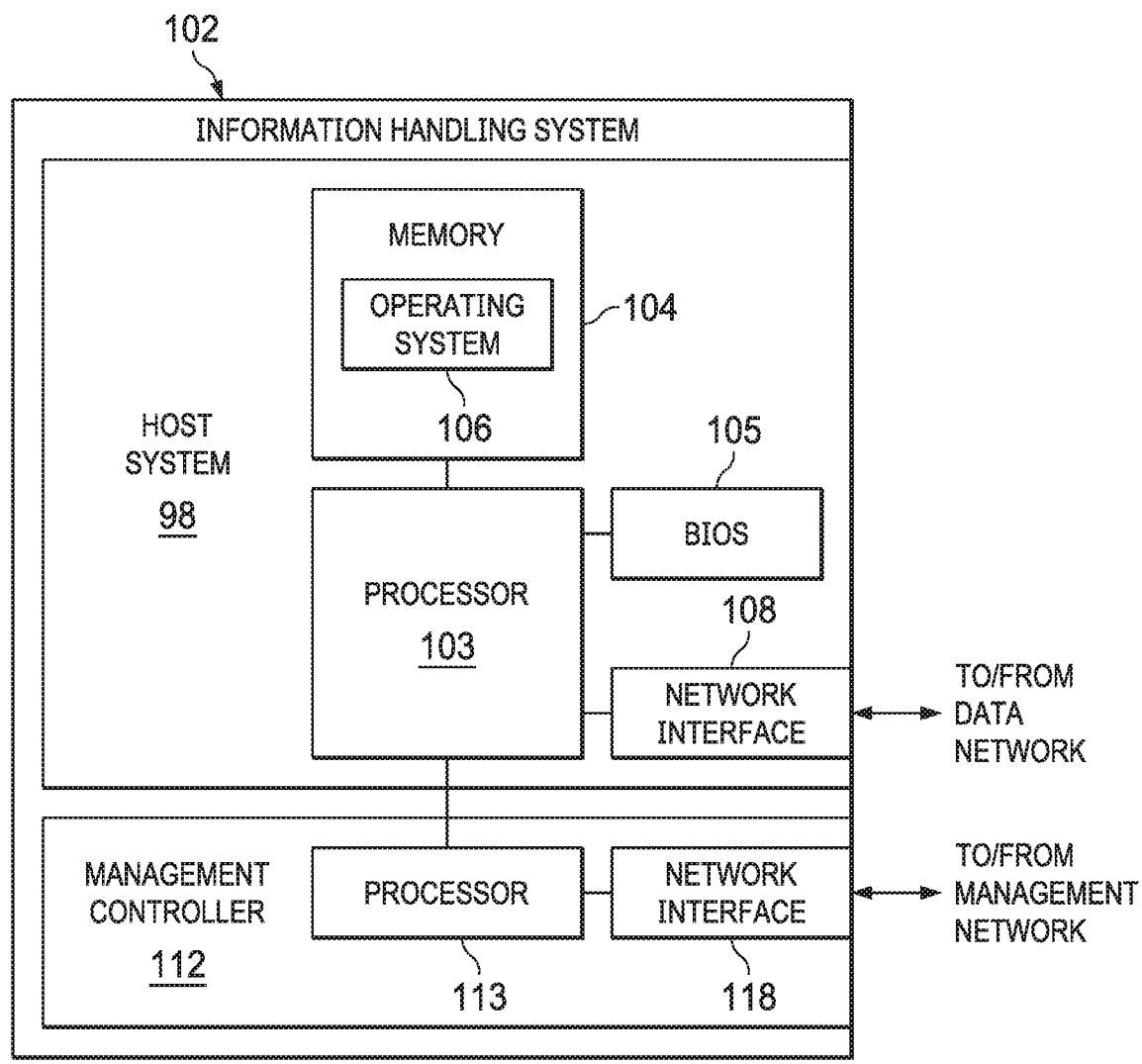
FIG. 1 illustrates a block diagram of an example information handling system, in accordance with embodiments of the present disclosure.
Figure 2:
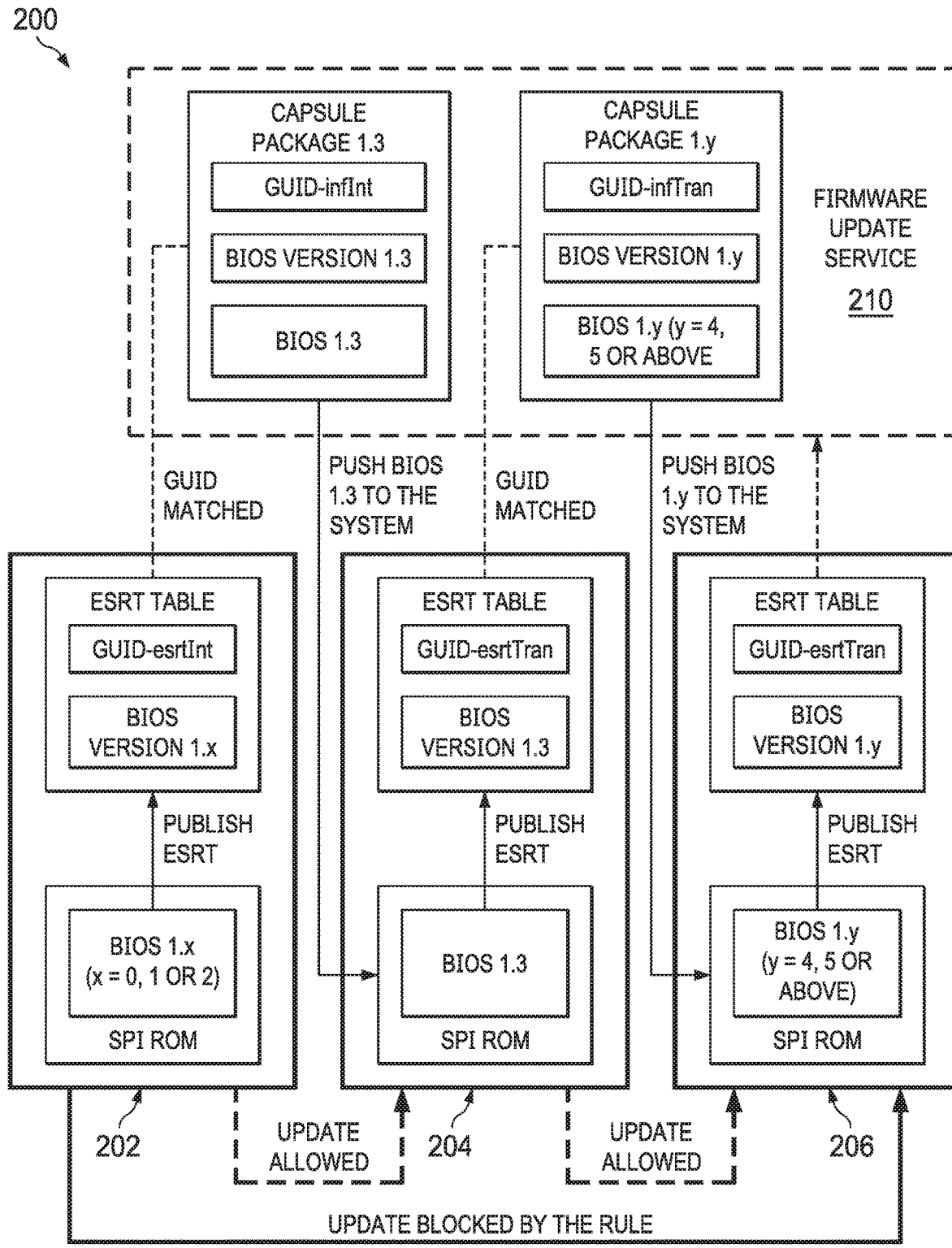
FIG. 2 illustrates an example flow diagram of a method in accordance with embodiments of the present disclosure.

Preferred embodiments and their advantages are best understood by reference to FIGS. 1 through 2, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As noted above, some embodiments of this disclosure may provide for implementation of sequencing rules in a firmware update service that does not natively support such rules. For example, specification of required intermediate firmware versions may be defined and enforced.

Some examples of firmware update services typically deliver firmware update packages as device driver packages. A device driver may contain a file (e.g., a plaintext file such as an INF file) describing the devices to which the package applies. The update mechanism for an information handling system may provide for the system to uniquely identify itself in order to bind to particular firmware driver packages that are applicable to such system. This may be accomplished in some embodiments by using an Extensible Firmware Interface (EFI) System Resource Table (ESRT) Globally Unique Identifier (GUID). Each information handling system (for example, all instances of a particular model number or specific configuration) may be identified by the same unique GUID.

Each system firmware may populate a unique GUID in the ESRT. The firmware update package may use a GUID (e.g., a hardware ID) in the INF file to match the target system's GUID as specified in the ESRT. The firmware update service may use these identifiers to determine which firmware updates are applicable to a given target system.

Thus the firmware update service may push a firmware update package to the target system whenever a newer version is available that is applicable to that system, and it may determine whether a particular update is applicable to a particular system by comparing the GUID in the firmware update package's INF file to the GUID in the target system's ESRT.

In some embodiments of this disclosure, "virtual" update rules and sequencing may be added to the firmware update service by manipulation of the GUIDs stored in the ESRT and the INF files of particular firmware update packages.

FIG. 2 illustrates a flow chart of an example method 200 in accordance with embodiments of the present disclosure. In this example method, various firmware updates for a BIOS are shown. In the following discussion it is to be noted that the value GUID-esrtInt (the initial GUID written to the target system's ESRT) is equal to GUID-InfInt (the initial GUID present in an update package's INF file). Similarly, the value GUID-esrtTran=GUID-InfTran.

At state 202, a system is built with a unique initial GUID stored in its ESRT (GUID-esrtInt). For example, a manufacturer may ship the system with the value GUID-esrtInt stored in its ESRT. This value may be common to all systems of a particular model or configuration, in some embodiments.

Various firmware update packages may be distributed by firmware update service 210. For example, a firmware update package (e.g., including both the firmware payload and an INF file) may first be transmitted by a hardware manufacturer to firmware update service 210 for distribution. The INF file may specify an identifier referred to as GUID-InfInt (e.g., the initial GUID stored in the INF file), which matches the GUID-esrtInt value stored in the target system's ESRT. This allows the update mechanism to push newer firmware packages when available, because of the matching values GUID-esrtInt and GUID-InfInt.

In some embodiments, a transitional BIOS requirement may be present. The system shown in FIG. 2 has a BIOS dependency of version 1.3 for updating to any higher version. That is, the system may fail or lose certain functionality if it is upgraded directly from BIOS version 1.0 or 1.1 or 1.2 (e.g., version 1.x where x=0, 1, 2) to a BIOS version 1.4 or newer (e.g., version 1.y where y=4, 5, etc.). Thus BIOS version 1.3 is referred to as a "transitional" or "intermediate" BIOS. To solve this problem (e.g., to ensure that version 1.3 is applied before any newer version is applied), the firmware update service should prevent updates from any version below 1.3 to any version of 1.4 or higher, forcing the target system to upgrade first to version 1.3.

In some embodiments, firmware update packages for BIOS versions 1.0 to 1.2 may be built including an ESRT GUID equal to GUID-esrtInt. The firmware update package INF file of the updated packages for version 1.0 to 1.2 may also be built with the same GUID, GUID-InfInt, and thus they may match any system with that value stored in its ESRT. This is illustrated at state 202.

A firmware update package for BIOS version 1.3 may be built with a new ESRT GUID, GUID-esrtTran. The firmware update package for this BIOS version, however, still uses the older GUID-InfInt in its INF file.

The firmware update service 210 may initiate firmware updates for the system containing any BIOS version from 1.0 to 1.2, to upgrade such systems to BIOS version 1.3. This is enabled because the installed system BIOS versions 1.0 to 1.2 include an ESRT GUID that matches with the GUID stored in the INF file for the firmware update package for version 1.3 (that is, GUID-infInt).

Once the system has been updated with the BIOS version 1.3, as shown at state 204, the ESRT GUID on the system is changed to GUID-esrtTran. This is shown at state 206. This alteration of the GUID stored in the system's ESRT may be accomplished as part of the installation process of the BIOS version 1.3, in some embodiments.

BIOS versions 1.3 (and newer) may be built with the ESRT GUID set to the value GUID-esrtTran. The firmware update package for BIOS version 1.4 (and newer) may be built with an INF GUID set to the value GUID-InfTran.

As noted above, BIOS version 1.3 (the transition BIOS) has an ESRT GUID equal to GUID-esrtTran, which matches the firmware update package INF file of BIOS version 1.4. This allows the client system to update to BIOS version 1.4 (or newer).

BIOS version 1.2, however, cannot update directly to version 1.4. This is because the ESRT GUID, which is equal to GUID-esrtInt, does not match with the firmware update package INF file GUID, which is equal to GUID-InfTran. Accordingly, a "virtual" sequencing rule may be added to the firmware update service by manipulating the system ESRT GUID and the firmware update package INF GUIDs. Multiple rules and more complex sequencing may can be achieved by changing such GUID values.

One of ordinary skill in the art with the benefit of this disclosure will understand that the preferred initialization point for the method depicted in FIG. 2 and the order of the steps comprising that method may depend on the implementation chosen. In these and other embodiments, this method may be implemented as hardware, firmware, software, applications, functions, libraries, or other instructions. Further, although FIG. 2 discloses a particular number of steps to be taken with respect to the disclosed method, the method may be executed with greater or fewer steps than those depicted. The method may be implemented using any of the various components disclosed herein (such as the components of FIG. 1), and/or any other system operable to implement the method.

The example above is further explained with reference to the following tables. As noted above, the scenario in this example is that the system cannot update directly from BIOS versions 1.0, 1.1, or 1.2 to 1.4. The system can update from BIOS version 1.3 to 1.4 or 1.5, and it can update from version 1.4 to 1.5. Thus, to update from version 1.0 to 1.5, the following sequence may be used: from 1.0, update to 1.3; then update from 1.3 to 1.5. (This relatively simple example is provided for illustrative purposes. One of ordinary skill in the art with the benefit of this disclosure will understand that more complicated sequencing rules may also be implemented.)

As shown below, Table 1 illustrates a situation in which the current system BIOS version is 1.0; Table 2 illustrates a situation in which the current system BIOS version is 1.1; Table 3 illustrates a situation in which the current system BIOS version is 1.2; Table 4 illustrates a situation in which the current system BIOS version is 1.3; and Table 5 illustrates a situation in which the current system BIOS version is 1.4. (Note: GUID-esrtInt=GUID-InfInt; GUID-esrtTran=GUID-InfTran.)

TABLE 1

Current System BIOS version is 1.0

| BIOS version 1.0 BIOS ESRT GUID | Firmware update package version | Firmware package INF file GUID | Results/Comments |
|---|---|---|---|
| GUID-esrtInt | 1.1 | GUID-InfInt | Successful update |
| | 1.2 | GUID-InfInt | Successful update |
| | 1.3 | GUID-InfInt | Successful update (1.3 is the transition version) |
| | 1.4 | GUID-InfTran | No update (version 1.3 is a dependency, GUID mismatch) |
| | 1.5 | GUID-InfTran | No update (version 1.3 is a dependency, GUID mismatch) |

TABLE 2

Current System BIOS version is 1.1

| BIOS version 1.1 BIOS ESRT GUID | Firmware update package version | Firmware package INF file GUID | Results/Comments |
|---|---|---|---|
| GUID-esrtInt | 1.0 (roll back) | GUID-InfInt | Customer rollback from device manager, successful update |
| | 1.2 | GUID-InfInt | Successful update |
| | 1.3 | GUID-InfInt | Successful update (1.3 is the transition version) |
| | 1.4 | GUID-InfTran | No update (version 1.3 is a dependency, GUID mismatch) |
| | 1.5 | GUID-InfTran | No update (version 1.3 is a dependency, GUID mismatch) |

TABLE 3

Current System BIOS version is 1.2

| BIOS version 1.2 BIOS ESRT GUID | Firmware update package version | Firmware package INF file GUID | Results/Comments |
|---|---|---|---|
| GUID-esrtInt | 1.0 (roll back) | GUID-InfInt | Customer rollback from device manager, successful update |
| | 1.1 (roll back) | GUID-InfInt | Customer rollback from device manager, successful update |
| | 1.3 | GUID-InfInt | Successful update (1.3 is the transition version) |
| | 1.4 | GUID-InfTran | No update (version 1.3 is a dependency, GUID mismatch) |
| | 1.5 | GUID-InfTran | No update (version 1.3 is a dependency, GUID mismatch) |

TABLE 4

Current System BIOS version is 1.3

| BIOS version 1.3 BIOS ESRT GUID | Firmware update package version | Firmware package INF file GUID | Results/Comments |
|---|---|---|---|
| GUID-esrTran Version 1.3 is the transition BIOS | 1.0 (roll back) | GUID-InfInt | Cannot go back to pre-transition version, rollback fails (expected) |
| | 1.1 (roll back) | GUID-InfInt | Cannot go back to pre-transition version, rollback fails (expected) |
| | 1.2 (roll back) | GUID-InfInt | Cannot go back to pre-transition version, rollback fails (expected) |
| | 1.4 | GUID-InfTran | Successful update, dependency met |
| | 1.5 | GUID-InfTran | Successful update, dependency met |

TABLE 5

Current System BIOS version is 1.4

| BIOS version 1.4 BIOS ESRT GUID | Firmware update package version | Firmware package INF file GUID | Results/Comments |
|---|---|---|---|
| GUID-esrTran | 1.0 (roll back) | GUID-InfInt | Cannot go back to pre-transition version, rollback fails (expected) |
| | 1.1 (roll back) | GUID-InfInt | Cannot go back to pre-transition version, rollback fails (expected) |
| | 1.2 (roll back) | GUID-InfInt | Cannot go back to pre-transition version, rollback fails (expected) |
| | 1.3 (roll back) | GUID-InfTran | Customer rollback from device manager, successful update |
| | 1.5 | GUID-InfTran | Successful update, dependency met |

Although various possible advantages with respect to embodiments of this disclosure have been described, one of ordinary skill in the art with the benefit of this disclosure will understand that in any particular embodiment, not all of such advantages may be applicable. In any particular embodiment, some, all, or even none of the listed advantages may apply.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor;
   an information handling resource including a firmware; and
   a memory coupled to the at least one processor and having
      an initial identifier indicative of an initial firmware version stored therein in an Extensible Firmware Interface (EFI) System Resource Table (ESRT);

wherein the information handling system is configured to:
receive a first firmware update package specifying the initial identifier, wherein the first firmware update package includes therein an intermediate identifier different from the initial identifier and indicative of an intermediate firmware version;
based on the first firmware update package specifying the initial identifier, update the firmware with contents of the first firmware update package, and update the initial identifier in the ESRT with the intermediate identifier;
receive a second firmware update package specifying the intermediate identifier, wherein the second firmware update package includes therein a final identifier different from the initial identifier, different from the intermediate identifier, and indicative of a final firmware version; and
based on the second firmware update package specifying the intermediate identifier, update the firmware with contents of the second firmware update package, and update the intermediate identifier in the ESRT with the final identifier.

2. The information handling system of claim 1, wherein the initial identifier and the intermediate identifier comprise Globally Unique Identifiers (GUIDs).

3. The information handling system of claim 1, wherein, based on the intermediate identifier not matching the initial identifier, the information handling system is configured to prevent the firmware from being updated with the contents of the second firmware update package until after the firmware has been updated with the contents of the first firmware update package.

4. The information handling system of claim 1, wherein the first and second firmware update packages are received from a firmware update service.

5. The information handling system of claim 1, wherein the initial identifier is assigned by a manufacturer of the information handling system.

6. The information handling system of claim 1, wherein the first firmware update package includes the intermediate identifier in an INF file therein.

7. A method comprising:
receiving, at an information handling system having an initial identifier indicative of an initial firmware version stored therein in an Extensible Firmware Interface (EFI) System Resource Table (ESRT), a first firmware update package specifying the initial identifier, wherein the first firmware update package includes therein an intermediate identifier different from the initial identifier and indicative of an intermediate firmware version;
based on the first firmware update package specifying the initial identifier, the information handling system updating a firmware with contents of the first firmware update package, and updating the initial identifier in the ESRT with the intermediate identifier;
the information handling system receiving a second firmware update package specifying the intermediate identifier, wherein the second firmware update package includes therein a final identifier different from the initial identifier, different from the intermediate identifier, and indicative of a final firmware version; and
based on the second firmware update package specifying the intermediate identifier, the information handling system updating the firmware with contents of the second firmware update package, and updating the intermediate identifier in the ESRT with the final identifier.

8. The method of claim 7, wherein the initial identifier is assigned by a manufacturer of the information handling system.

9. The method of claim 7, further comprising:
based on the intermediate identifier not matching the initial identifier, preventing the firmware from being updated with the contents of the second firmware update package until after the firmware has been updated with the contents of the first firmware update package.

10. An article of manufacture comprising a non-transitory, computer-readable medium having computer-executable code thereon that is executable by a processor of an information handling system for:
transmitting, to a client system, a first firmware update package specifying an initial identifier indicative of an initial firmware version and including therein an intermediate identifier that is different from the initial identifier and indicative of an intermediate firmware version, wherein the client system has the initial identifier stored in an Extensible Firmware Interface (EFI) System Resource Table (ESRT) thereof;
based on the first firmware update package specifying the initial identifier, causing the client system to update a firmware thereof with contents of the first firmware update package, and causing the client system to update the initial identifier in the ESRT thereof with the intermediate identifier;
transmitting, to the client system, a second firmware update package specifying the intermediate identifier, wherein the second firmware update package includes therein a final identifier different from the initial identifier, different from the intermediate identifier, and indicative of a final firmware version; and
based on the second firmware update package specifying the intermediate identifier, causing the client system to update the firmware thereof with contents of the second firmware update package, and causing the client system to update the intermediate identifier in the ESRT with the final identifier.

11. The article of claim 10, wherein the initial identifier and the intermediate identifier comprise Globally Unique Identifiers (GUIDs).

12. The article of claim 10, wherein, based on the intermediate identifier not matching the initial identifier, the client system is configured to prevent the firmware from being updated with the contents of the second firmware update package until after the firmware has been updated with the contents of the first firmware update package.

13. The article of claim 10, wherein the first and second firmware update packages are transmitted via a firmware update service.

14. The article of claim 10, wherein the initial identifier is assigned by a manufacturer of the client system.

15. The article of claim 10, wherein the first firmware update package includes the intermediate identifier in an INF file therein.

* * * * *